(12) United States Patent
Melen et al.

(10) Patent No.: US 6,263,121 B1
(45) Date of Patent: Jul. 17, 2001

(54) ARCHIVAL AND RETRIEVAL OF SIMILAR DOCUMENTS

(75) Inventors: Roger D. Melen, Los Altos Hills, CA (US); Michael G. Roberts, Waikoloa, HI (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/156,273

(22) Filed: Sep. 16, 1998

(51) Int. Cl.7 ................................................. G06K 9/54
(52) U.S. Cl. ............................................ 382/305; 382/306
(58) Field of Search ..................................... 382/305, 306; 707/1, 3, 102, 10

(56) References Cited

U.S. PATENT DOCUMENTS

| | | | |
|---|---|---|---|
| 5,926,824 | * 7/1999 | Hashimoto | 382/305 |
| 5,933,548 | * 8/1999 | Morisawa | 382/306 |
| 5,963,954 | * 10/1999 | Burrows | 707/102 |
| 5,987,471 | * 11/1999 | Bodine et al. | 707/103 |
| 6,041,360 | * 3/2000 | Himmel et al. | 709/245 |
| 6,049,799 | * 4/2000 | Mangat et al. | 707/10 |
| 6,061,478 | * 5/2000 | Kanoh et al. | 382/305 |
| 6,070,157 | * 5/2000 | Jacobson et al. | 707/1 |

* cited by examiner

Primary Examiner—Yon J. Couso
(74) Attorney, Agent, or Firm—Fenwick & West LLP

(57) ABSTRACT

System and method for archiving and retrieving documents based on attributes of the document. The attributes are located by a processor that searches the document for a predefined set of attributes. The attributes may be particular words, word locations, font sizes, or other properties that can be located by a computer processor. The values associated with the attributes are stored in an index along with the document location. An attribute search may be performed on the index enabling quick location of documents with similar attributes to the search. A file provided the list of documents in order of similarity is provided as a result of the search. The system and method may further be used to retrieve similar documents by locating documents with similar attribute values to a provided document creating a file linked to the similar documents.

19 Claims, 6 Drawing Sheets

180

SAMPLE POINTER FILE

CATEGORY A DOCUMENTS ─ 410

CLIENT A  
CLIENT B  } 420
CLIENT C

CATEGORY B DOCUMENTS

FORM A  
FORM B  
FORM C

CATEGORY C DOCUMENTS

DATE A  
DATE B  
DATE C

FIG. 4

ARCHIVAL AND RETRIEVAL OF SIMILAR DOCUMENTS

TECHNICAL FIELD

This invention pertains to the archival and retrieval of documents. More specifically, the present invention is a system and method for archiving documents that enables retrieval based on attributes of the archived documents.

BACKGROUND ART

In many archival systems, documents are archived based on particular attributes of the documents. On computers, folders are often used to create a set of documents that fall in a particular category. For example, a document generated on a computer could be archived in a folder bearing the name of the client for whom it was generated with the further attribute of case number stored in the document name. Those attribute values can later used in order to retrieve the document from its storage location by executing a search for a file with a name including the case number or by searching for a folder with the client name.

A problem with archiving based on a particular set of attributes arises, however, when a document or document set that has a particular attribute is desired and the documents are not archived based on the desired attribute, making retrieval difficult and potentially expensive. This problem is exacerbated when a document is not desired for a particular attribute of the document but is instead desired based on the similarity between the attributes of the archived document and the attributes of another document. For example, if a particular form is used during a transaction, a user may wish to retrieve all forms having the same format. Since the documents may not have been archived based on the document format, the user would have to retrieve each document and individually compare it to the desired form.

The problem is even more difficult when both paper and electronic documents are involved. At the present time, electronic documents may be located based on a predefined set of attributes or properties stored by the computer. In Windows 95®, an operating system that runs on IBM-compatible personal computers, electronic documents may be searched based on values such as the date the document was modified, the size of the document, or simple text searches for words in the document. The limitations of this system, however, are that the attributes used in the search can include only those attributes that the computer has stored as part of the document properties. These limitations are evident when a search is performed in order to locate documents similar to another document.

A further problem with standard electronic archival systems is the inability to integrate the attributes of paper documents that have been converted into a digital format and the previously stored electronic documents. When a document is scanned into the computer, the computer can generate a list of associated properties only through either user input, such as an entry form that can be filled in by the user, or by creating artificial properties of the document, such as using the date on which the document was scanned as the date of creation.

What is needed, then, is a system and method for archiving both scanned paper documents and electronic documents based on attribute values located in the documents such that the documents can later be retrieved based on those attributes. What is further needed is a system and method for locating archived documents based on the similarities between the archived document and a paper or electronic document.

DISCLOSURE OF INVENTION

The present invention is a system and method for locating attribute values located in a document while enabling archival and retrieval based on these attribute values. A document (130) is either retrieved in, or translated into, a digital format by an input device (120). A master list (150) contains the attribute values to be searched for in the document (130). The master list (150) may include a default list of attributes or may categorize the document and provide a list of attributes accordingly. An attribute processor (160) locates the attributes and stores the attribute values in an attribute index (170). If a search for similar documents is performed, a pointer file (180) is created containing document pointers ordered according to the similarity between the attribute values of documents stored in a document set (140) and the retrieved or translated document (130). Pointers in the pointer file (180) provide a means for retrieval of the similar documents.

BRIEF DESCRIPTION OF THE DRAWINGS

These and other more detailed and specific objects and features of the present invention are more fully disclosed in the following specification, reference being had to the accompanying drawings, in which:

FIG. 4 is a sample pointer file of the present invention;

DETAILED DESCRIPTION OF THE PREFERRED EMBODIMENTS

The present invention is a system and method for archiving documents while enabling retrieval based on the attributes of the documents in a document set. The documents may include electronic files generated by scanning a paper document, electronic documents or a combination of both types of documents. The invention stores one or more pages of the scanned document in a digital format. A search for particular attributes is performed on each of these documents. The values associated with the particular attributes are stored in an index which is then used to generate a listing of documents placed in order of the value of the attributes.

Figure 1:
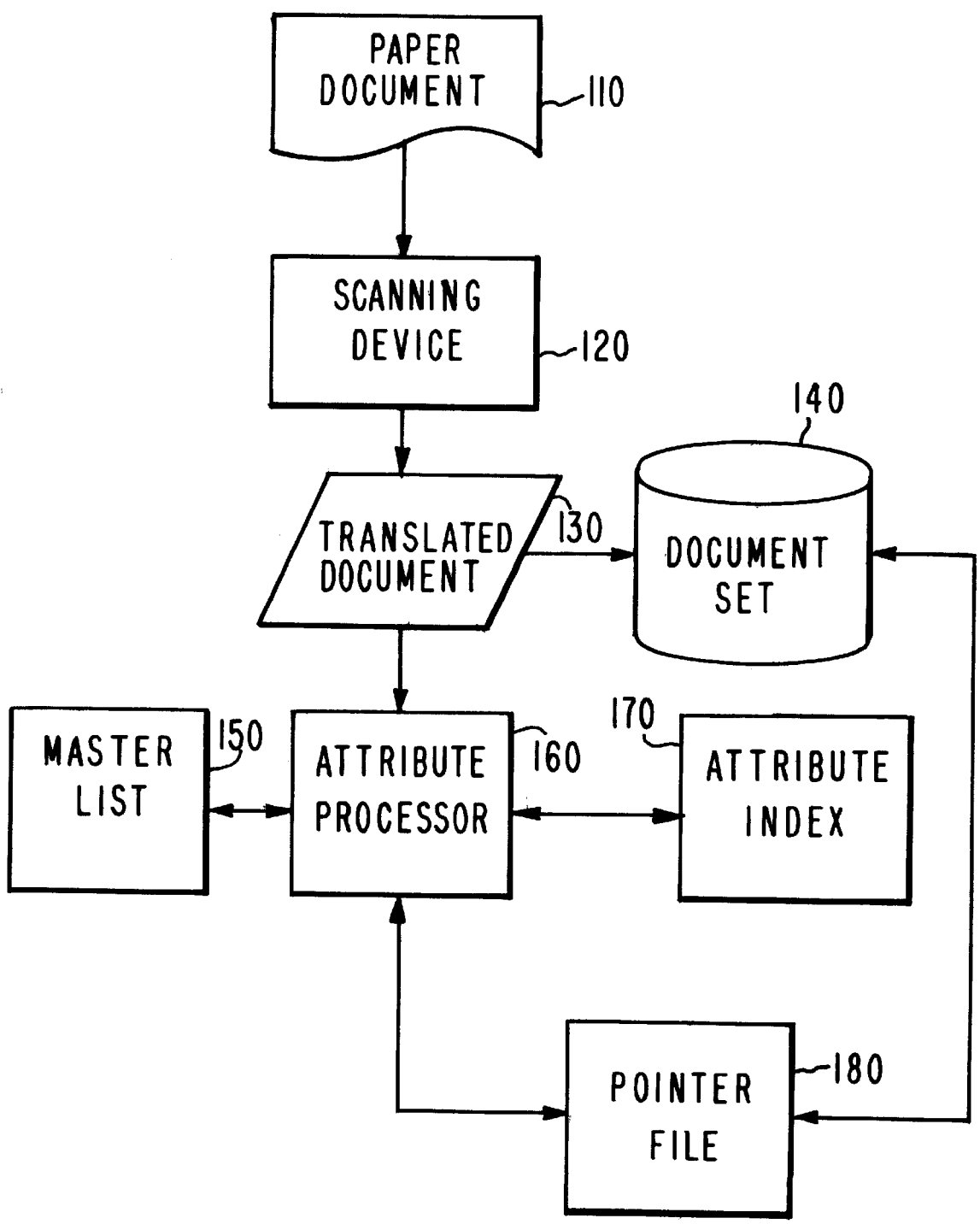
FIG. 1 is a simplified diagram that provides an overview of the present invention.

FIG. 1, illustrates the present invention. The system of the present invention comprises: a document set 140 comprising documents stored in digital format; an input device 120 for translating paper documents into a digital format; a master list 150 containing a list of document attributes; an attribute processor 160 for retrieving the attributes from the master list 150 and locating those attributes in the documents; and an attribute index 170 for storing the located attribute values. A pointer file 180 is created that contains pointers to documents, wherein the pointers are sorted according to the respective attribute values of the documents. The system may further comprise one or more paper documents 110 that are translated into a digital format.

Paper documents are translated into a digital format by an input device 120. The input device 120 scans the document and stores the scanned image. In the preferred embodiment, the input device 120 is an optical scanner that generates an image of the document. Alternatively, the input device comprises any device capable of capturing an image of a document, such as a digital camera. The image generated by the input device 120 may be further translated into a digital document by optical character recognition software. Both the digital document and the document image created by the input device 120 comprise the translated document 130 and are passed to the attribute processor 160.

The attribute processor 160 comprises a processor capable of searching through a digital image or document in accordance with a retrieved attribute list. The attribute processor 160 receives the translated document 130 from the input device 120 and further retrieves a list of attributes from the master list 150. The attributes in the list 150 may comprise properties of the document 130, such as the number of words in the translated document 130, or the attributes may combine elements and locations within the document 130, such as the first word on the third line of the document 130.

The attributes retrieved from the master list 150 may also vary depending on the properties of the translated document 130. If a document 130 has a set of attributes or attribute values matching a particular format, the processor could search for a different set of attributes in the document 130. For example, if the translated document 130 is identified as a fax cover sheet, the attribute list retrieved from the master list by the processor 160 could direct the processor to locate the value of any telephone numbers located in the document 130. Further description of the master list and the process of retrieving the list of attributes is explained with reference to FIGS. 2 and 6 below.

Once the attribute processor 160 has retrieved the attribute list, each of the attributes in the list is located in the translated document 130. The attribute values generated by the search are stored in the attribute index 170. The attributes in the master list comprise any attribute that can be identified with an optical scanner equipped with optical character recognition software. For instance, the master list may contain an attribute such as document type. If the word FAX is within the first few lines, the attribute value may be stored as FAX or, if the document types are mapped to numeric values, the attribute value may be stored as document type five.

The attribute index 170 stores the attribute values located in the translated document 130 along with the attribute values of documents already in the document set 140. The values are indexed along with document identification so that the attribute values can be matched to the corresponding document in the document set 140. The document identification information may be a document number or may comprise the location of the document within the document set 140. Storing the attribute values in the attribute index 170 enables identification and retrieval of documents based on the attribute values of the document 130.

The attribute index 170 may be searched by the processor for either particular attribute values, such as a search for all documents of a certain length, or may be searched for documents similar to the translated document 130, such as a search based on the attribute values located in the translated document 130. If the search is based on the translated document, the processor 160 retrieves attribute values from the attribute index 170 and searches for each attribute individually. The processor 160 generates a pointer file 180 that includes a list of document pointers ordered according to the attribute values of the corresponding documents. For example, if the retrieved attribute values were document lengths, the document pointers are ordered according to the respective lengths of the documents. Several categories of attribute values may also be used to generate the pointer file 180. For instance, if the attributes of interest are "form type" and "length" the document pointers may be initially ordered according to the type of form with a secondary ordering on document length.

Once the pointer file 180 has been generated, the document pointers provide access to the documents by providing a path to the document in the document set. The document set is coupled to the pointer file 180 by communications means such as a communications bus on a computer, network communication lines on a network, or other means for communicating digital information. The documents in the document set 140 may also be stored in different locations. For example, one or more documents may be stored on a particular computer on a network while other documents are stored on a network server. Additionally, the pointers may be simple addresses identifying the location of the document or may be dynamic links, such as hyperlinks written in hypertext markup language (HTML), that enables document retrieval as soon as the pointer is selected with an additional input device, such as a mouse or keyboard on a computer.

Figure 2:
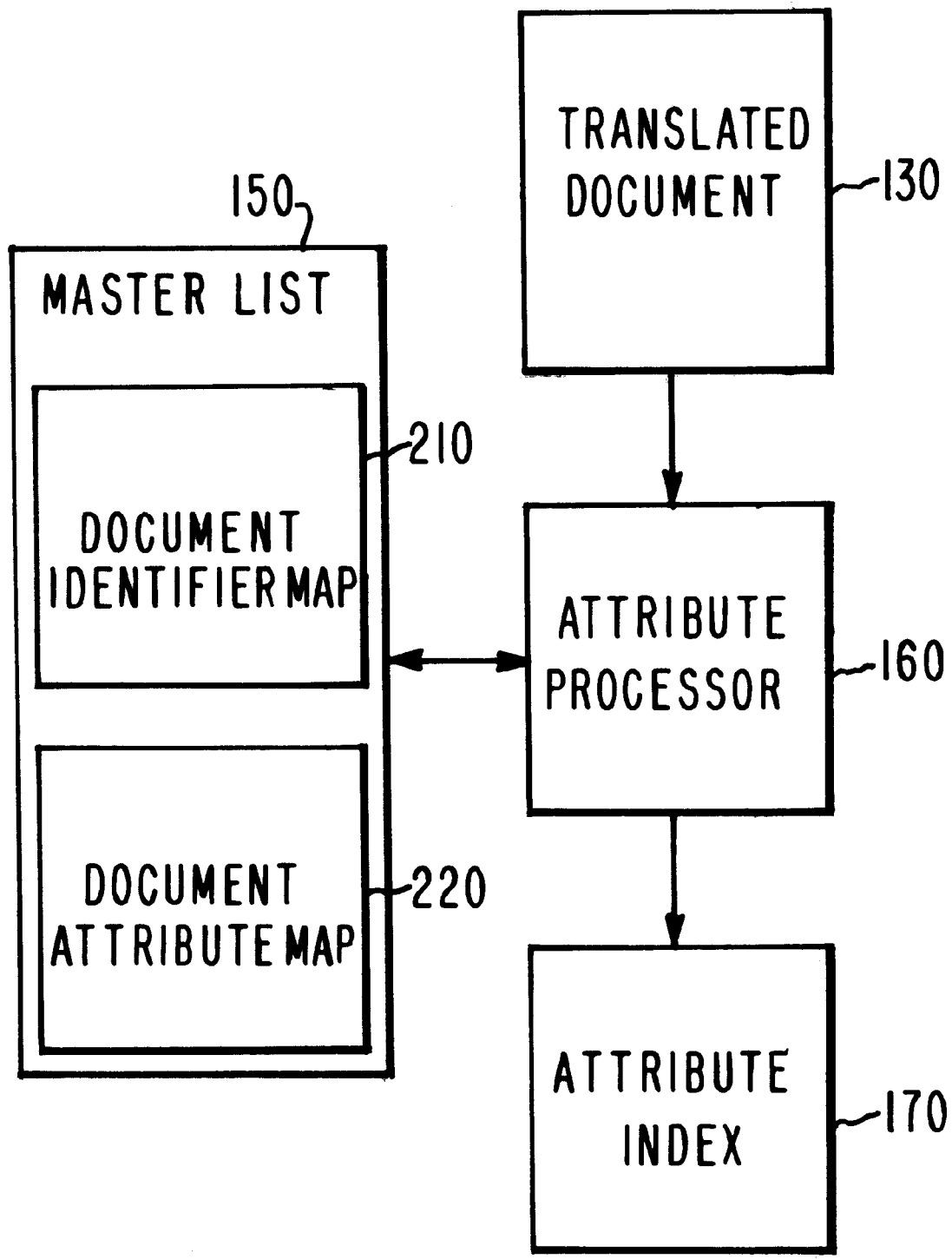
FIG. 2 is a block diagram illustrating a preferred system for locating and storing attribute values located in a document.

FIG. 2 is a block diagram illustrating additional details of the process of retrieving attributes from the master list and searching a document for the retrieved attributes. The diagram comprises a master list 150, a translated document 130, an attribute processor 160, and an attribute index 170. The master list 150 comprises attributes that will be located in the translated document 130. The particular attributes that are retrieved from the master list 150 may vary depending on the particular properties of the document. The document is transmitted to the attribute processor 160, which searches for the attributes corresponding to the document category. The located attribute values are stored in the attribute index 170 enabling quicker retrieval and ordering of documents based on the attribute values.

The master list 150 may also comprise a document identification map 210. The document identification map 210 provides the attribute processor 160 with one or more maps or template enabling categorization of the translated document 130 by specifying the attributes of documents that qualify for each category. The document identification map 210 may further comprise a default category for those documents that do not have the attributes of any of the maps 210.

The document identification map 210 may provide a listing of particular words, phrases, word or phrase locations, images, or other document properties that correspond to a particular document category. For example, a document identification map 210 that identifies documents in a category, such as a "faxed documents" category, may specify that the word FAX appear in the first two lines of the document 130 and that a particular phone number be contained somewhere in the translated document 130. Another example might be a map 210 that specifies that the word "form" be on the left hand side of the document followed by a particular form number. The values compared and retrieved, such as the form number in the above example, can also be used to create a new document category. Using numbers and information listed on the document to establish document categories enables creation of new document categories. In such a case, a form with a new form number would create a new category of documents without needing further changes or input to the master list 150.

When a document is being identified, the processor 160 retrieves a first document identification map 210 and compares the map 210 to the document 130. If the document does not have the elements specified in the map 210, then the next map 210 is retrieved. If all identification maps 210 have been retrieved from the master list 150 and the document 130 does not satisfy the criteria of any of the maps, then the document 130 may be placed in a default category. Alternately, the document 130 could be ignored if the document 130 does not match any of the maps 210. If the document does have the elements specified in a map 210, then the document is placed in the category associated with the map 210 and the proper attribute list or map 220 is retrieved. An example of the document identification map 210 is illustrated in FIG. 3.

The master list 150 is further comprised of a document attribute map 220. The document attribute map 220 contains a list of attributes for each document category. Once the document 130 has been placed in a category, the list of attributes corresponding to that category is retrieved by the processor 160 and the document 130 is searched for each of the attributes in the list. The list of attributes may comprise any attributes that can be assessed using a scanned image of the document or the text of the digital document. For example, if a document has been placed in a "FAX" category, the attribute list could search for attributes such as the originating phone number, the target phone number and the name of the sender. In order to identify these attributes, the attribute list may further provide key terms or locations that provide an indicator of the location of those attributes. For example, if the name of the sender is an attribute being searched for in the document, then term "sender name" followed by a location indicator, such as "follows", would tell the processor 160 to store the word or words that follows "sender name" in the attribute index 170. Further indicators may also specify the termination point of the retrieved property. Continuing with the example, the attribute list could indicate that the attribute value terminates with the first blank space. Therefore, the processor 160 locates the word that follows "sender name" and precedes the first blank space. The value is then stored in the attribute index 170 along with any other attribute values retrieved.

Figure 3:
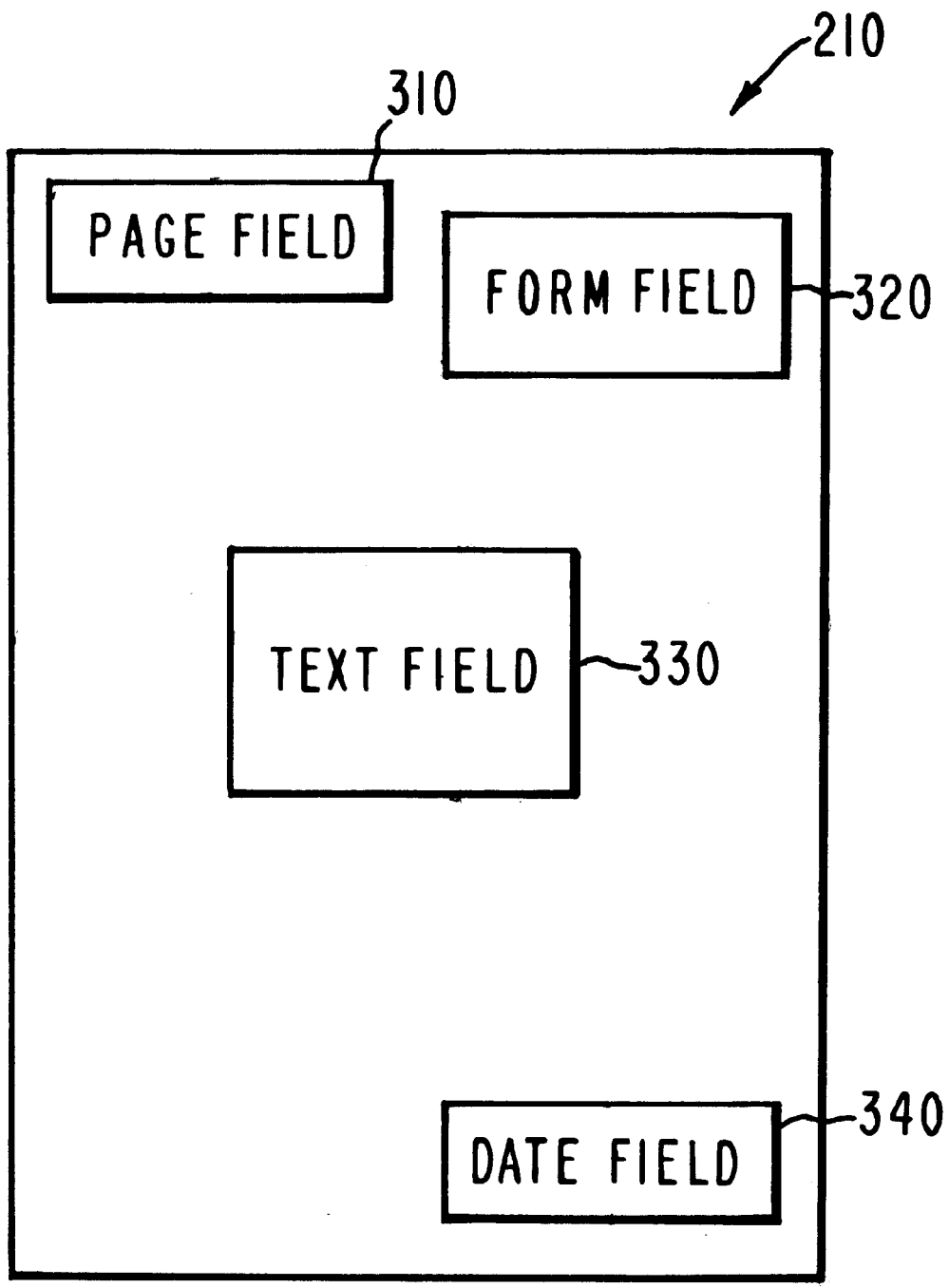
FIG. 3 is a diagram that illustrates the use of a document map for locating attribute values in a document.

Referring now to FIG. 3, an example of a document identification map 210 of the present invention is shown. The map 210 may be stored as an image, a text document, a table or in any other format that enables a processor to identify the document properties that will be used to categorize the document. FIG. 3 provides an example of a document identification map 210 stored as an image file. In the illustrated figure, the map 210 comprises fields 310, 320, 330, 340 that are matched to corresponding locations in the translated document 130. The four fields 310, 320, 330, 340 provide letters, numbers and locations that must be matched.

If the contents of the location in the translated document 130 match the contents specified by the field in the document map 210, then the document 130 is categorized accordingly. When comparing the translated document 130 with the document map 210, both the digital document or the document image may be used. If the document image is used, then areas of the document image may be individually compared with any text or characters in the corresponding area in the document 130. Alternatively, if the fields are described rather than visually depicted, such as specifying that a particular word must occur in the first one hundred words, then the digital document may be compared to the map 210.

In the present figure, the document map 210 is presented as an image file. The image comprises several fields 310, 320, 330, 340 that are compared to the document image of the translated document 130. A field 310 near the top of the map 210 contains the characters "page ##" indicating that the document 130 must contain the word "page" followed by a page number in the corresponding portion of the document 130. If the document image is used to determine whether the fields are matched, then optical character recognition software may be applied to the area of the image corresponding to the field in order to compare any words, numbers or characters in the field with the words, numbers, or characters in document 130.

Optical character recognition software may also be used to interpret the document map 210 if the map 210 comprises an image. For example, the map 210 may be provided on a paper document. The input device 120 translates the map 210 into an image stored in the master list 150. Special characters or symbols may be used to indicate the beginning or end of a field. The optical character recognition software translates the portion of the image between the beginning and end of the fields. The size and location of the field is maintained, either by storing the document image or by storing size and location values, in order to insure that the field is appropriately matched to the translated document 130. The processor 160 matches the contents of the field with the corresponding portion of the translated document 130 and determines whether the document 130 contains the values specified in the field. If the document 130 does not match each of the fields, then the processor 160 retrieves the next map 210 and compares it to the document 130. If each of the fields do match, then the document is placed in the appropriate category and the document attribute map 220 corresponding to that category is retrieved.

Although the document identification map 210 has been described as comprising a single map, several maps may be used in the identification process. For example, one map may specify that the word "form" be on the left hand side of the page. If this condition is met, then an additional map may search for a particular name in the document. Using several maps in succession enables quicker identification of documents by eliminating repeat searches for fields that are stored in different maps 210. The parameters retrieved from the document 130 when the fields are searched may also be used to categorize the document 130. For example, a map may specify that the word "form" be listed on the left hand side of the first page of the document and could further use the number following "form" as the category number.

Referring now to FIG. 4, a sample pointer file 180 is shown. The sample pointer file 180 comprises document pointers 420 that are listed under attribute headings and ordered according to the attribute value(s) 410 of the documents. The file 180 is created when a search request is submitted to the processor 160. The search request may comprise a listing of attributes or attribute values. A search comprising a document number is generated using the attribute values of the document matching the number. Searching on the attribute values of a document enables quick retrieval of similar documents by comparing the attribute values stored in the index 170 for each document. For example, if the search includes a document number, then the processor retrieves the attribute values of the document matching the document number from the attribute index 170 and searches for all documents with the same or similar attribute values. The attribute values retrieved may also include the category of the document matching the document number submitted in the request. For example, if the documents in the document set 140 have been categorized, then the processor retrieves the attribute values from the attribute index for each document in the same category and orders them according to attribute value.

The result of the search is a listing of documents having the attribute values contained in the search request. The search may be limited to exact matches or may include approximations to the attribute values specified. In the example illustrated in FIG. 4, the pointer file 180 was generated from a search on the category of the document. The document pointers in the pointer file may be ordered according to any or all of the attribute values retrieved. For example, the attributes could serve as headers 410 and, for each of the documents having that attribute, a document pointer 420 is generated linking the pointer file 180 with the document. In the preferred embodiment, the document pointers are hyperlinks created using hypertext markup language. The document is retrieved by viewing the pointer file 180 on an output device, such as a computer monitor, and selecting the link using an input device, such as a mouse or keyboard on a computer.

Figure 5:
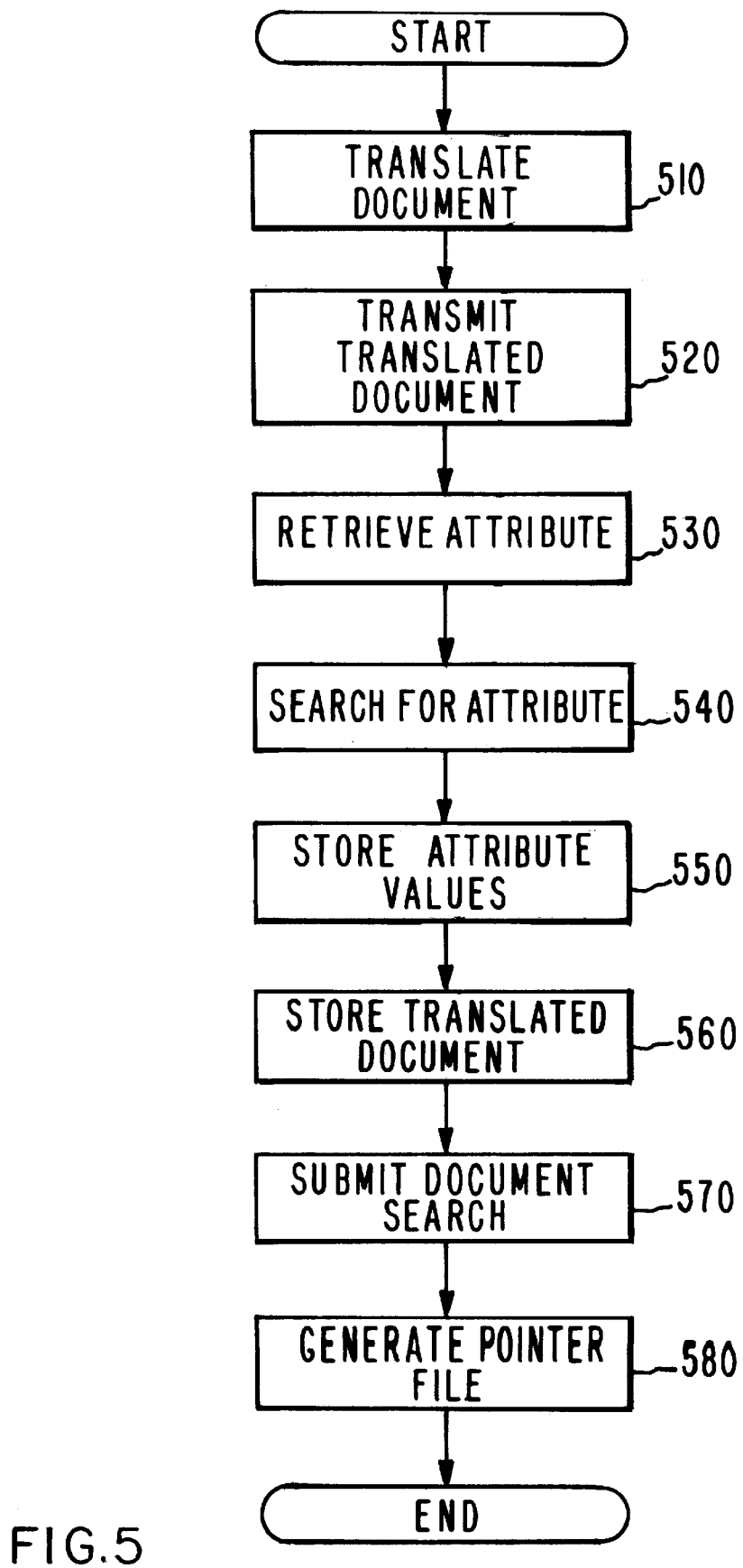
FIG. 5 is a flowchart diagram illustrating a preferred method for archiving and retrieving similar documents.

Referring now to FIG. 5, is a flowchart illustrating the method for archiving and retrieving similar documents. The method begins by translating 510 a paper document into a translated document 130. Initially, an input device, such as a scanner, creates an image of the document. The document image is further converted into a digital document. In the preferred embodiment, the image is converted into a digital document using optical character recognition software. The translated document 130, comprising the document image and the digital document, is transmitted 520 to the attribute processor 160. The processor 160 retrieves 530 a list of attributes to be located in the document. The list of attributes retrieved may be a default list or may be retrieved based on the category of the document. The processor searches 540 the translated document 130 for the attributes and stores 550 the attribute values in the attribute index 170. The translated document 130, or some portion of the translated document 130, is stored 560 in the document set.

The attributes and attribute values of the translated document 130 are submitted 570 to the processor as a document search. The processor receives the values and searches the attribute index 170 for the submitted attributes and attribute values. The processor generates 580 a pointer file 180 comprising pointers to documents having the same attributes or similar attribute values. The pointers provide a link to a document stored in the document set. The link may comprise the address of the document, such as a network address, or may comprise a link, such as a hyperlink, that provides direct access to the document. In the preferred embodiment, the pointers in the pointer file 180 are ordered according to similarity with the attributes and attribute values of the translated document 130. Alternatively, the document pointers may be listed under each attribute and ordered according to the attribute values of the corresponding document. The pointer file 180 is then stored or transmitted to an output device, such as a monitor, for viewing.

Figure 6:
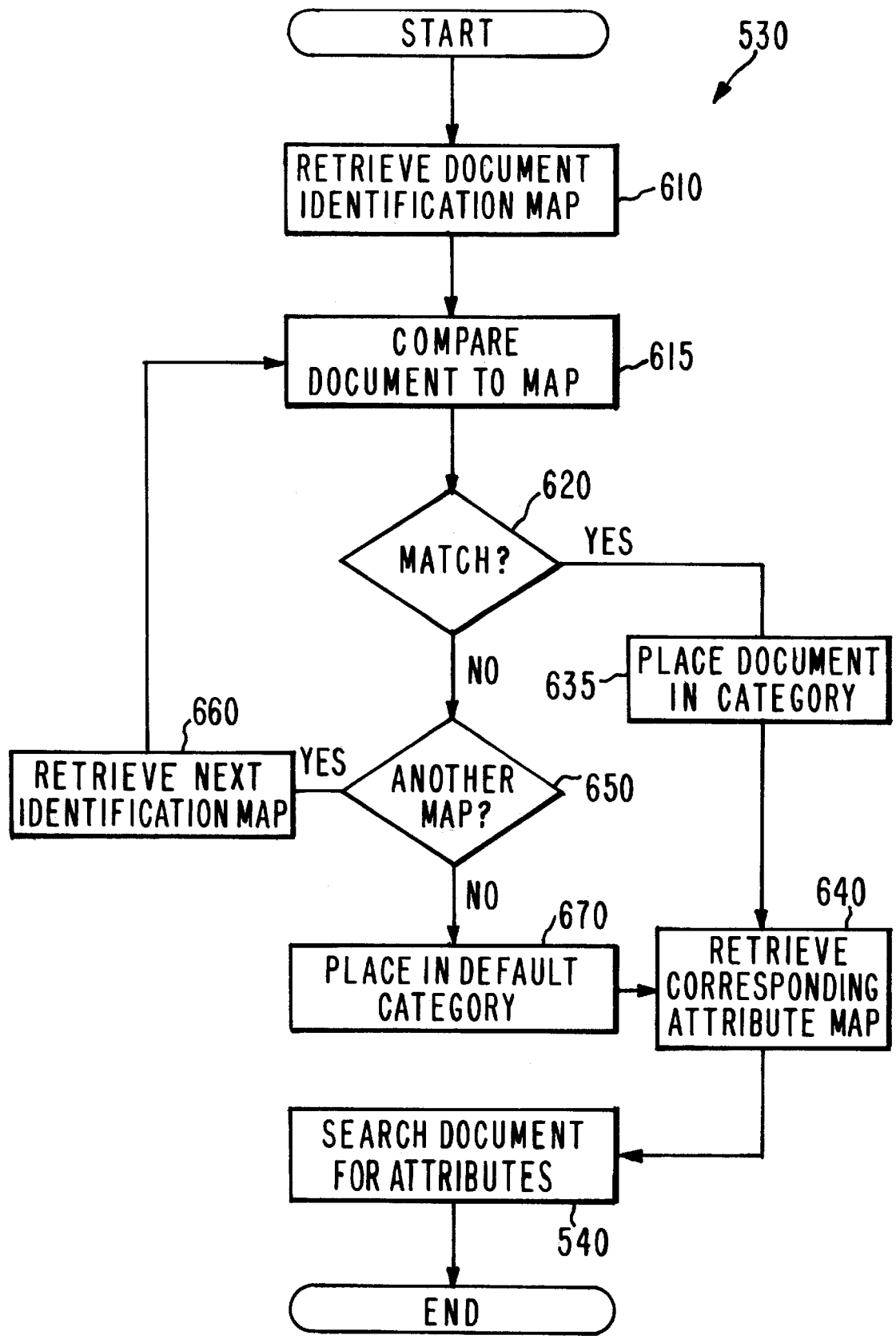
FIG. 6 provides a flowchart illustrating an attribute value search according to the present invention.

Referring now to FIG. 6, is a flowchart illustrating the process for identifying a document and retrieving the appropriate attribute map 220. The processor 160, which has already received the document 130, retrieves 610 a document identification map 210 from the master list 150. The document identification map 210 provides the attribute processor 160 with one or more maps or templates enabling categorization of the translated document 130 by specifying the attributes of documents that qualify for the category. The processor compares 620 the map 210 with the document 130 and determines whether the fields of the map and corresponding portions of the document match 630. If the document 130 and map 210 do not match, then the processor 160 determines 650 whether the master list 150 has another map 210. If more maps 210 are not available, then the document is placed 670 in a default category. If more maps 210 are available, then the processor 160 retrieves 660 the next identification map 210. The processor 160 continues to retrieve maps 210 and compares 620 the maps 210 with the document 130 until a match is found or there are no more maps 210 available in the master list 150. If the document 130 does match an identification map 210, then the document 130 is placed in the document category corresponding to the document map 210.

Once the document 130 has been placed in a category, whether placed in the category based on a match with a map 210 or placed in the default category, the processor 160 retrieves 640 the corresponding attribute map 220. The attribute map 220 may comprise attributes that can be located in the document 130 or assessed using an image of the document or in the text of the digital document. The processor 160 searches 540 the document 130 for the each of the attributes specified in the attribute map 220. Each of the attribute values are stored in the attribute index 170.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A system for indexing digital documents according to attributes, said system comprising:
    a document set containing at least one digital document;
    a master list containing a list of preselected attributes;
    coupled to the document set and to the master list, an attribute processor for locating preselected attributes in said digital documents; and
    an index for storing attribute values corresponding to preselected attributes located by the attribute processor;
    wherein the master list comprises a plurality of document identification maps corresponding to different document types, and a plurality of document attribute maps respectively associated with the document identification maps.

2. The system of claim 1, wherein at least one digital document was prepared using optical character recognition.

3. The system of claim 1, wherein at least one digital document corresponds to a paper document that was scanned by an optical scanner.

4. The system of claim 1, wherein the document identification maps contain elements that qualify a document for placement into a document category.

5. The system of claim 1, wherein at least one document identification map is a digital image.

6. The system of claim 1, wherein a document attribute map corresponds to a document category into which the document is placed by the attribute processor.

7. The system of claim 1 further comprising a file containing document pointers produced as a result of an attribute search that is conducted through the index.

8. A system for archiving documents, said system comprising:
    an attribute processor for searching the documents for document attributes;
    coupled to the attribute processor, a master list providing to the attribute processor a list of preselected document attributes to be searched for, wherein the master list contains a set of document identification maps corresponding to different document types, and a document attribute map associated with each type;

coupled to the attribute processor, a document set for storing the documents; and coupled to the attribute processor, an attribute index for storing, according to document type, attribute values corresponding to the preselected attributes located in the documents by the attribute processor and for storing the document set location of the documents.

9. The system of claim 8, wherein the attribute processor comprises a microprocessor.

10. The system of claim 8, wherein the document set comprises documents stored on a network.

11. The system of claim 10, wherein the document set comprises documents stored on different network nodes on the network.

12. The system of claim 8, further comprising a pointer file containing pointers to documents in the document set having attributes that are part of a query that is addressed to the attribute index in a search mode.

13. The system of claim 8, wherein at least one document identification map is a digital image.

14. The system of claim 8, wherein at least one document is indexed by the attribute processor using a plurality of document identification maps in succession.

15. A computer-implemented method for indexing and retrieving electronic documents, said method comprising the steps of:

compiling a master list comprising preselected attributes;

searching the electronic documents for the preselected attributes; and storing respective values of the attributes, as located in the electronic documents, in an attribute index;

wherein the master list comprises a plurality of document identification maps providing elements that qualify the electronic documents for placement into different document categories.

16. A computer-readable medium containing a computer program that: archives an electronic document by locating preselected attributes in the document based on an attribute list; places the document in a document set; indexes attributes located in the document, including the location of the document in the document set; and, responsive to a search request including attribute values corresponding to the preselected attributes, provides a list of documents having similar attribute values as values submitted in the request; wherein the attribute list is partitioned according to document type, so that the indexing step uses different sets of attributes in indexing the documents, depending upon document type.

17. The method of claim 15, wherein at least one document identification map comprises a digital image.

18. The method of claim 15, wherein each document identification map has an associated document attribute map corresponding to the document category into which the electronic document is placed by the attribute processor.

19. The method of claim 15, further comprising the steps of:

using the preselected attributes to query the attribute index; and creating a file containing links to the electronic documents, wherein the document links are ordered according to similarity between the attributes of the query and the attribute values in the attribute index.

* * * * *